: US 11,289,980 B2
(45) Date of Patent: Mar. 29, 2022

(54) MOTOR

(71) Applicant: NIDEC CORPORATION, Kyoto (JP)

(72) Inventors: Yuki Ishikawa, Kyoto (JP); Takayuki Migita, Kyoto (JP); Shuhei Nakamatsu, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 131 days.

(21) Appl. No.: 16/631,890

(22) PCT Filed: Jun. 19, 2018

(86) PCT No.: PCT/JP2018/023310
§ 371 (c)(1),
(2) Date: Jan. 17, 2020

(87) PCT Pub. No.: WO2019/021696
PCT Pub. Date: Jan. 31, 2019

(65) Prior Publication Data
US 2020/0161937 A1    May 21, 2020

(30) Foreign Application Priority Data

Jul. 28, 2017  (JP) .............................. JP2017-147108

(51) Int. Cl.
*H02K 9/19*      (2006.01)
*H02K 1/20*      (2006.01)
(Continued)

(52) U.S. Cl.
CPC ................ *H02K 9/19* (2013.01); *H02K 1/20* (2013.01); *H02K 5/20* (2013.01); *H02K 9/00* (2013.01);
(Continued)

(58) Field of Classification Search
CPC .......... H02K 9/193; H02K 11/33; H02K 5/20; H02K 9/19; H02K 1/20; H02K 5/203;
(Continued)

(56) References Cited

U.S. PATENT DOCUMENTS 7,525,224 B2   4/2009  Takenaka et al.
10,305,345 B2  5/2019  Nakanishi et al.
(Continued)

FOREIGN PATENT DOCUMENTS

CN    102638133 A    8/2012
JP    H2-79746 A     3/1990
(Continued)

OTHER PUBLICATIONS

Hirose et al, Drive Unit for Vehicle, Apr. 17, 2008, Toyota Jidosha, JP 2008092727 (English Machine Translation) (Year: 2008).*
(Continued)

*Primary Examiner* — Quyen P Leung
*Assistant Examiner* — Alexander A Singh
(74) *Attorney, Agent, or Firm* — Hauptman Ham, LLP

(57) ABSTRACT

One aspect of a motor of the present disclosure may include a rotor having a motor shaft disposed along a central axis extending in one direction, a stator facing the rotor via a gap in a radial direction, and a housing having an accommodating portion configured to accommodate the rotor and the stator, and to enable oil to be stored therein, wherein the housing comprises a lower wall portion facing a vertical-directional lower region in the inside of the accommodating portion, the lower wall portion comprises a cooling flow passage formed therein, and refrigerant flows in the cooling flow passage, and at least a portion of the cooling flow passage overlaps the vertical-directional lower region in the inside of the accommodating portion when viewed along a vertical direction.

16 Claims, 7 Drawing Sheets

(51) Int. Cl.
*H02K 5/20* (2006.01)
*H02K 9/193* (2006.01)
*H02K 9/00* (2006.01)
*H02K 9/197* (2006.01)
*H02K 11/33* (2016.01)

(52) U.S. Cl.
CPC ............. *H02K 9/193* (2013.01); *H02K 9/197* (2013.01); *H02K 11/33* (2016.01)

(58) Field of Classification Search
CPC .. H02K 1/32; H02K 9/00; H02K 9/02; H02K 9/04; H02K 9/06; H02K 9/08; H02K 9/10; H02K 9/12; H02K 9/14; H02K 9/16; H02K 9/18; H02K 9/20; H02K 9/22; H02K 9/223; H02K 9/225; H02K 9/227; H02K 9/24; H02K 9/26; H02K 9/28
USPC ..... 310/52, 53, 54, 55, 56, 57, 58, 59, 60 R, 310/61, 62, 63, 60 A, 64
See application file for complete search history.

(56) References Cited

U.S. PATENT DOCUMENTS

| | | | | |
|---|---|---|---|---|
| 2003/0222519 | A1* | 12/2003 | Bostwick | H02K 5/20 310/58 |
| 2005/0253465 | A1* | 11/2005 | Takenaka | H02K 5/20 310/52 |
| 2010/0194219 | A1* | 8/2010 | Hotta | B60L 3/0046 310/54 |
| 2012/0305226 | A1* | 12/2012 | Chamberlin | H02K 5/20 165/121 |
| 2016/0281740 | A1* | 9/2016 | Mitsuda | F04D 17/10 |
| 2020/0204044 | A1* | 6/2020 | Lee | H02K 1/32 |

FOREIGN PATENT DOCUMENTS

| | | | |
|---|---|---|---|
| JP | H10-164793 | A | 6/1998 |
| JP | 2004-194362 | A | 7/2004 |
| JP | 2008-92727 | A | 4/2008 |
| JP | 2008092727 | A * | 4/2008 |
| JP | 2009-146961 | A | 7/2009 |
| JP | 2011-148062 | A | 8/2011 |
| JP | 2011148062 | A * | 8/2011 |
| JP | 2011-213290 | A | 10/2011 |
| JP | 2013-55728 | A | 3/2013 |

OTHER PUBLICATIONS

Sakai et al, Machine Tool, Aug. 4, 2011, Mori Seiki Co Ltd, JP 2011148062 (English Machine Translation) (Year: 2011).*

* cited by examiner

MOTOR

CROSS REFERENCE TO RELATED APPLICATIONS

This is the U.S. national stage of application No. PCT/JP2018/023310, filed on Jun. 19, 2018, and priority under 35 U.S.C. § 119(a) and 35 U.S.C. § 365(b) is claimed from Japanese Application No. 2017-147108, filed on Jul. 28, 2017.

FIELD OF THE INVENTION

The present disclosure relates to a motor.

BACKGROUND

A rotary electric machine provided with a case for storing lubricating fluid for cooling and lubricating a stator and a rotor has been known. For example, a related art discloses a rotary electric machine mounted on a vehicle.

For example, the lubrication fluid as described above is drawn out of a case and then cooled. However, in this case, it is necessary to provide a flow passage for drawing the lubricating fluid from the case to the outside, which causes a problem that a structure of the rotary electric machine becomes complicated. In addition, in order to secure air-tightness of the case, it is necessary to accurately seal a connecting portion between the flow passage for drawing the lubricating fluid to the outside and the case, which may increase the labor and cost of manufacturing the rotary electric machine.

SUMMARY

In view of the above circumstances, an object of the present disclosure is to provide a motor which can suitably cool oil stored in a housing with a simple structure.

One aspect of a motor of the present disclosure may include a rotor having a motor shaft disposed along a central axis extending in one direction, a stator facing the rotor via a gap in a radial direction, and a housing having an accommodating portion configured to accommodate the rotor and the stator, and to enable oil to be stored therein, wherein the housing comprises a lower wall portion facing a vertical-directional lower region in the inside of the accommodating portion, the lower wall portion comprises a cooling flow passage formed therein, and refrigerant flows in the cooling flow passage, and at least a portion of the cooling flow passage overlaps the vertical-directional lower region in the inside of the accommodating portion when viewed along a vertical direction.

The above and other elements, features, steps, characteristics and advantages of the present disclosure will become more apparent from the following detailed description of the preferred embodiments with reference to the attached drawings.

DETAIL DESCRIPTION

A Z-axial direction shown in each drawing is a vertical direction Z in which a positive side is an upper side and a negative side is a lower side. In an exemplary embodiment of the present disclosure, the vertical direction Z is an upward/downward in FIG. 2. In the following description, a vertical-directional upper side is simply referred to as "an upper side", and a vertical-directional lower side is simply referred to as "a lower side".

Figure 1:
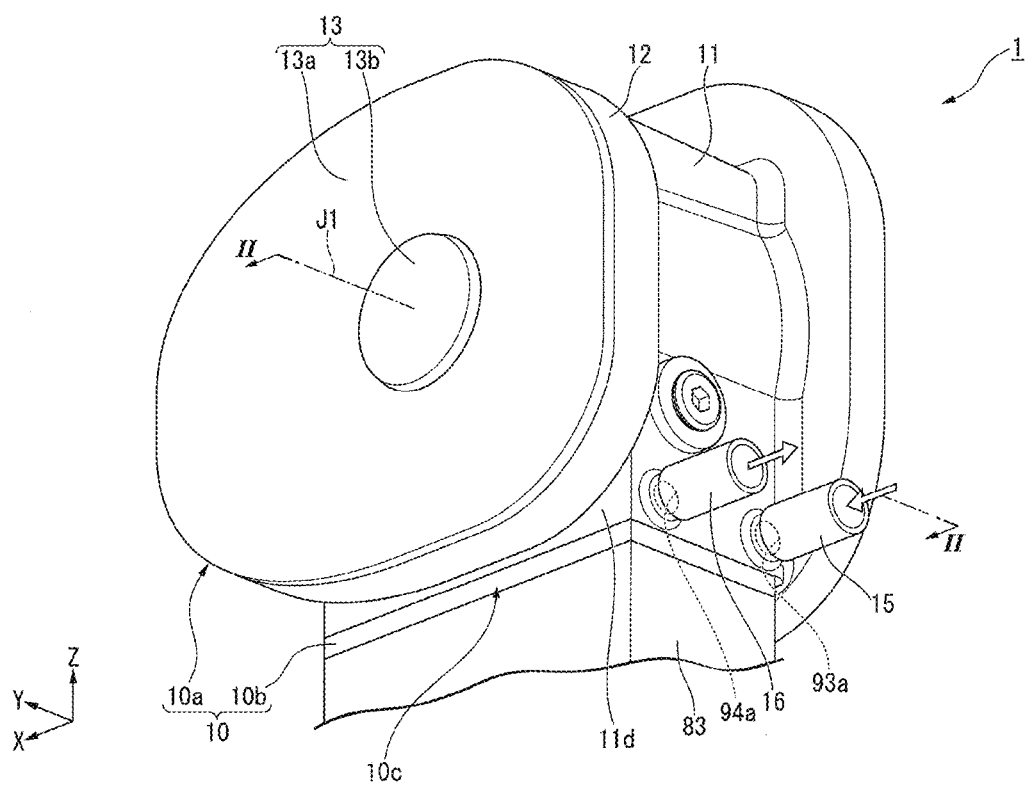
FIG. 1 is a perspective view showing a motor according to an exemplary embodiment of the present disclosure.
Figure 2:
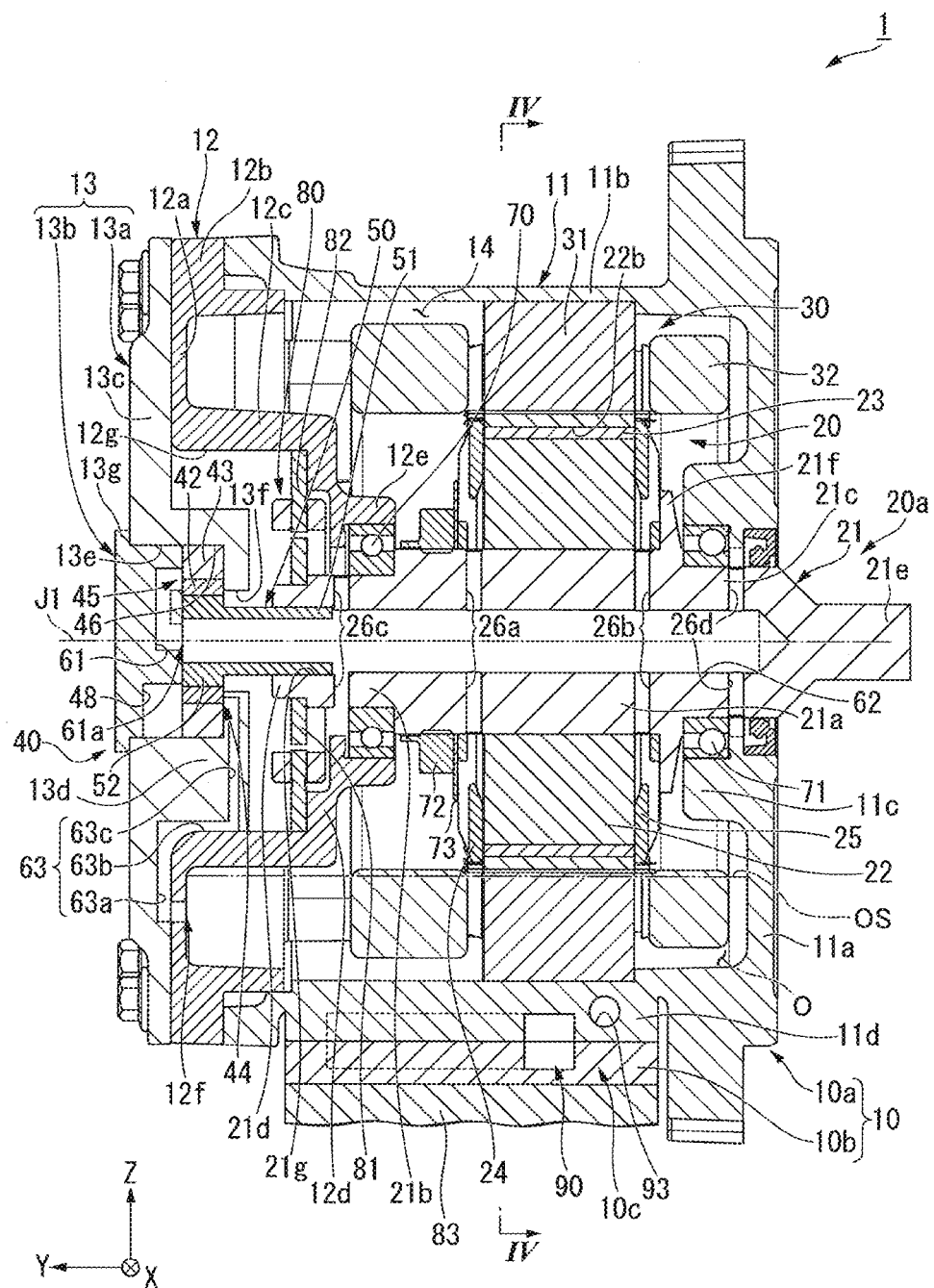
FIG. 2 is a view showing the motor according to an exemplary embodiment of the present disclosure, and is a cross-sectional view taken along the line II-II in FIG. 1.

As shown in FIGS. 1 and 2, a motor 1 of an exemplary embodiment of the present disclosure includes a housing 10, a rotor 20 having a motor shaft 20a disposed along a central axis J1 extending in one direction, a rotation detector 80, a stator 30, a pump part 40, bearings 70 and 71, and an inverter 83.

As shown in FIG. 2, the central axis J1 extends in a left-right direction in FIG. 2. That is, in an exemplary embodiment of the present disclosure, the left-right direction in FIG. 2 corresponds to one direction. A Y-axial direction shown in each drawing is a direction parallel to the central axis J1. In the following description, a direction parallel to an axial direction of the central axis J1 is simply referred to as "axial direction Y", a radial direction centered on the central axis J1 is simply referred to as "radial direction", and a circumferential direction centered on the central axis JI is simply referred to as "circumferential direction". Further, a left side in FIG. 2 in the axial direction Y, that is, a positive side in the Y-axial direction is referred to as "one axial-directional side", and a right side in FIG. 2 in the axial direction Y, that is, a negative side in the Y-axial direction is referred to as "the other axial directional side". In addition, a X-axial direction shown in each drawing is a direction orthogonal to both of the axial direction Y and the vertical direction Z. In the following description, a direction parallel to the X-axial direction is referred to as "widthwise direction X". Furthermore, a positive side in the X-axial direction of the widthwise direction X is referred to as "one widthwise-directional side", and a negative side in the X-axial direction of the widthwise direction X is referred to as "the other widthwise-directional side".

The housing 10 includes a first housing 10a and a second housing 10b. The first housing 10a includes a main body portion 11, an inner lid portion 12, and an outer lid portion 13. In an exemplary embodiment of the present disclosure, the main body 11, the inner lid portion 12, and the outer lid portion 13 are separate members. The main body 11 has a bottomed cylindrical shape that opens towards one axial-directional side. The main body portion 11 includes a bottom portion 11a, a main body cylindrical portion 11b, a bearing holding portion 11c, and a flow passage forming portion 11d.

The bottom portion 11a has an annular plate shape that expands in the radial direction. The main body cylinder portion 11b has a cylindrical shape extending from a radial-directional outer edge of the bottom portion 11a to one axial-directional side. The bearing holding portion 11c has a cylindrical shape protruding from an inner edge of the bottom portion 11a to one axial-directional side. The bearing holding portion 11c holds the bearing 71 on an inner circumferential surface thereof.

Figure 3:
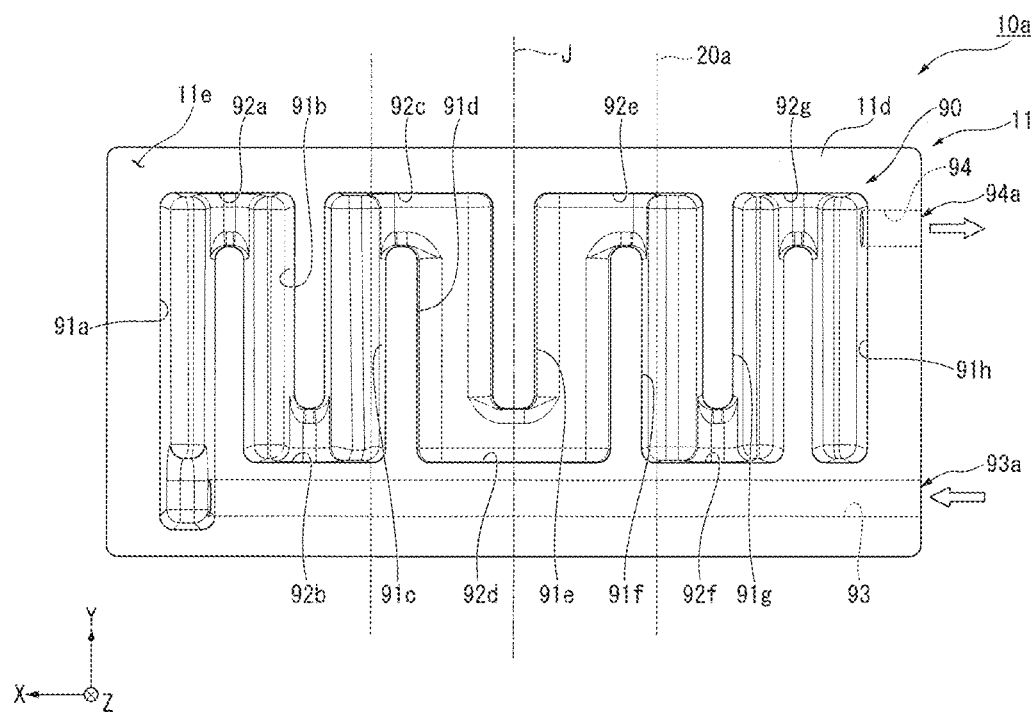
FIG. 3 is a view of a part of a first housing of an exemplary embodiment of the present disclosure when viewed from below.
Figure 4:
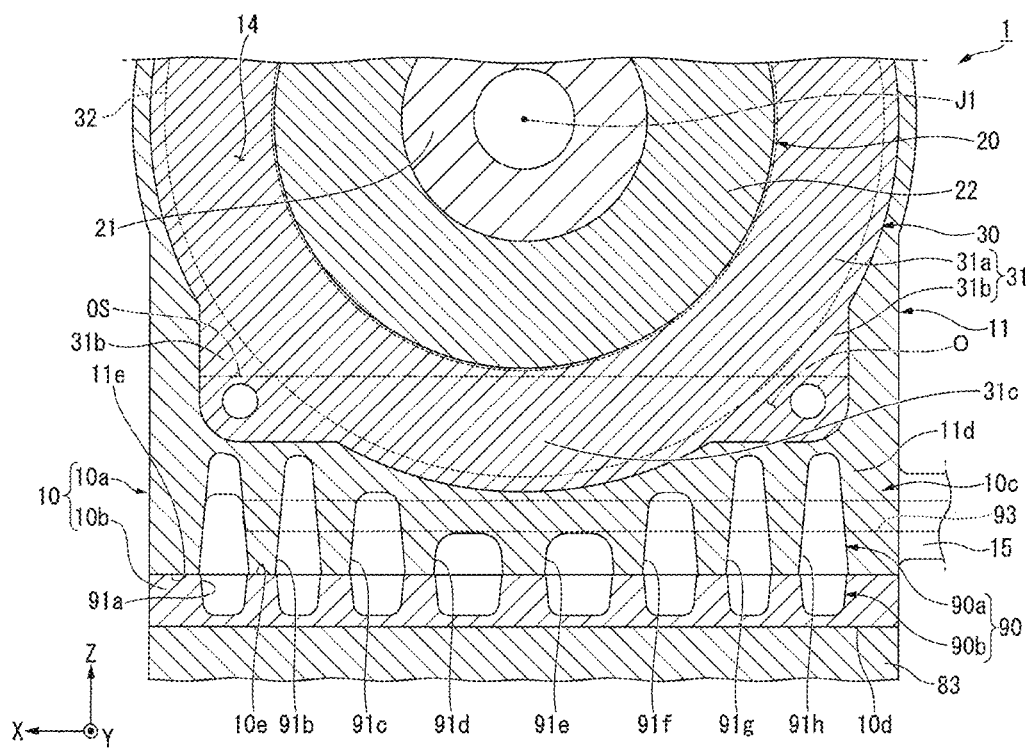
FIG. 4 is a view showing a part of the motor of an exemplary embodiment of the present disclosure, and is a cross-sectional view taken along the line IV-IV in FIG. 2.

The flow passage forming portion 11d is a lower end portion of the main body 11. As shown in FIGS. 3 and 4, the flow passage forming portion 11d has a first contact face 11e facing downward. That is, the first housing 10a has the first contact face 11e. The first contact face 11e is a flat face orthogonal to the vertical direction Z. As shown in FIG. 3, the first contact face 11e has a substantially rectangular shape that is elongated in the widthwise direction X.

As shown in FIG. 2, the inner lid portion 12 is attached to one axial-directional side of the main body portion 11. The inner lid portion 12 includes an annular plate portion 12a, an outer cylinder portion 12b, an inner cylinder portion 12c, an inner cylinder bottom portion 12d, and a bearing holding portion 12e. The annular plate portion 12a has an annular plate shape that expands in the radial direction. The annular plate portion 12a covers one axial-directional side of the stator 30. That is, the inner lid portion 12 covers the one axial-directional side of the stator 30. An opening 12f that passes through the annular plate portion 12a in the axial direction Y is provided at a lower end of the annular plate portion 12a. The opening 12f is exposed to an accommodating portion 14 described later.

The outer cylinder portion 12b is a cylindrical shape extending from a radial-directional outer edge of the annular plate portion 12a to the other axial-directional side. An end portion of the other axial-directional side of the outer cylinder portion 12b is in contact with and fixed to an end portion of one axial-directional side of the main body cylindrical portion 11b. The inner cylinder portion 12c has a cylindrical shape extending from a radial-directional inner edge of the annular plate portion 12a to the other axial-directional side. The inner cylinder bottom portion 12d has an annular shape that expands radially inward from an end portion of the other axial-directional side of the inner cylinder portion 12c. Due to the inner cylinder portion 12c and the inner cylinder bottom portion 12d, on the inner lid portion 12, a second concavity portion 12g concaved from a face of one axial-directional side of the inner lid portion 12 to the other axial-directional side. That is, the inner lid portion 12 has the second concavity portion 12g. In an exemplary embodiment of the present disclosure, the face of the one axial-directional side of the inner lid portion 12 is a face of one axial-directional side of the annular plate portion 12a. An inner side face of the second concavity portion 12g includes a radial-directional inner side face of the inner cylinder portion 12c and a face of one axial-directional side of the inner cylinder bottom portion 12d.

The bearing holding portion 12e has a cylindrical shape that protrudes from a face of the other axial-directional side of the inner cylinder bottom portion 12d to the other axial-directional side. The bearing holding portion 12e holds the bearing 70 on an inner circumferential surface thereof. That is, the inner lid portion 12 holds the bearing 70.

The main body portion 11 and the inner lid portion 12 are fixed to each other, so the accommodating portion 14 surrounded by the main body portion 11 and the inner lid portion 12 is configured. That is, the first housing 10a has the accommodating portion 14. In addition, the housing 10 has the accommodating portion 14. The accommodating portion 14 accommodates the rotor 20 and the stator 30, and may be able to store oil O. The oil O is stored in a vertical-directional lower region inside the accommodating portion 14. In this specification, "the vertical-directional lower region inside the accommodating portion" includes a portion located below a center of the vertical direction Z in the accommodating portion.

In an exemplary embodiment of the present disclosure, a liquid surface OS of the oil O stored in the accommodating portion 14 is located above the opening 12f. As a result, the opening 12f is exposed to the oil O stored in the accommodating portion 14. The liquid surface OS of the oil O is varied as the oil O is suctioned upward by the pump part 40, but is disposed below the rotor 20 at least when the rotor 20 is rotated. Due to the above, when the rotor 20 is rotated, it is possible to suppress the oil O from acting as a rotational resistance of the rotor 20.

The outer lid portion 13 is attached to the one axial-directional side of the inner lid portion 12. The outer lid portion 13 includes an outer lid main body portion 13a and a plug body portion 13b. The outer lid main body portion 13a expands in the radial direction. The outer lid main body portion 13a includes a lid plate portion 13c and a protruding portion 13d. The lid plate portion 13c has a disk shape that expands in the radial direction. A radial-directional outer edge of the lid plate portion 13c is fixed to the radial-directional outer edge of the annular plate portion 12a. A face of the other axial-directional side of the lid plate portion 13c is in contact with the face of one axial-directional side of the annular plate portion 12a. The protruding portion 13d protrudes from a central portion of the lid plate portion 13c to the other radial-directional side. The protruding portion 13d is inserted into the inner cylinder portion 12c from one axial-directional side. The protruding portion 13d is disposed at one axial-directional side of the inner cylinder bottom portion 12d at an interval.

The outer lid main body portion 13a has a first concavity portion 13e and a second through-hole 13f. The first concavity portion 13e is concaved from a face of one axial-directional side of the outer lid main body portion 13a to the other axial-directional side. The first concavity portion 13e is formed at a central portion of the outer lid main body portion 13a, and is formed across the lid plate portion 13c and the protruding portion 13d. The second through-hole 13f penetrates from a lower face of the first concavity portion 13e to a face of the other axial-directional side of the protruding portion 13d. That is, the second through-hole 13f penetrates from the lower face of the first concavity portion 13e to the inside of the housing 10. The second through-hole 13f is opened inside the second concavity portion 12g. Due to the above, the second through-hole 13f connects the inside of the first concavity portion 13e and the inside of the second concavity portion 12g to each other. The central axis J1 passes through the second through-hole 13f.

The plug body portion 13b is fitted into the first concavity portion 13e to be fixed to the outer lid main body portion 13a. The plug body portion 13b closes an opening of one axial-directional side of the first concavity portion 13e. The plug body portion 13b covers one axial-directional side of the motor shaft 20a. That is, the outer lid portion 13 covers the one axial-directional side of the motor shaft 20a. The plug body portion 13b has a flange portion 13g, which is formed at an end portion of one axial-directional side and protrudes outward in the radial direction. The flange portion 13g is in contact with a face of one axial-directional side of the lid plate portion 13c. Due to the above, the plug body portion 13b may be positioned in the axial direction Y.

Figure 5:
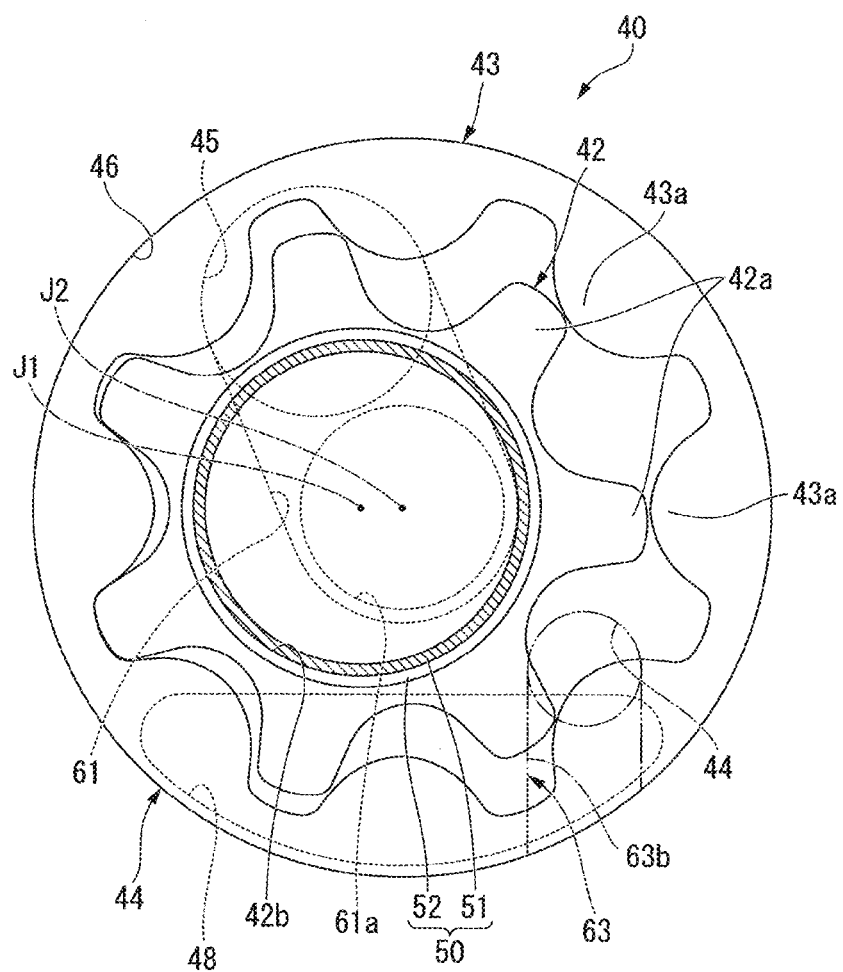
FIG. 5 is a view of a pump part of an exemplary embodiment of the present disclosure when viewed from the other axial-directional side.

A pump chamber 46 is installed in the outer lid portion 13. The pump chamber 46 is installed between a face of the other axial-directional side of the plug body portion 13b and a lower face of the first concavity portion 13e in the axial direction Y. In an exemplary embodiment of the present disclosure, a face of the other axial-directional side of the pump chamber 46 is a lower face of the first concavity portion 13e. A face of one axial-directional side of the pump chamber 46 is a face of the other axial-directional side of the plug body portion 13b. The pump chamber 46 is an end portion of the other axial-directional side of inner faces of the first concavity portion 13e. The pump chamber 46 is disposed in a radial-directional inner side of the inner cylinder portion 12c, that is, inside the second concavity portion 12g. The central axis J1 passes through the pump chamber 46. As shown in FIG. 5, an external shape of the pump chamber 46 is circular shape when viewed in the axial direction. The pump chamber 46 accommodates an internal gear 43 and an external gear 42 which will be described later.

As shown in FIG. 1, the second housing 10b is fixed to the first housing 10a on a lower side of the first housing 10a. The second housing 10b has a rectangular shape, with each plain of the rectangular shaped second housing being flat in the vertical direction Z. As shown in FIG. 4, the second housing 10b has a second contact face 10e, which faces an upper side and is in contact with the first contact face 11e. The second contact face 10e is a flat face orthogonal to the vertical direction Z.

In an exemplary embodiment of the present disclosure, a lower wall portion 10c is configured by the second housing 10b and the flow passage forming portion 11d. That is, the housing 10 has the lower wall portion 10c. The lower wall portion 10c faces the vertical-directional lower region in the accommodating portion 14. In an exemplary embodiment of the present disclosure, the flow passage forming portion 11d of the lower wall portion 10c faces the vertical-directional lower region in the accommodating portion 14. An upper face of the lower wall portion 10c, that is, an upper face of the flow passage forming portion 11d constitutes a lower side face of inner side faces of the accommodating portion 14. The lower wall portion 10c constitutes a portion of the accommodating portion 14. A lower face 10d which is a lower side face of the lower wall portion 10c is a flat face orthogonal to the vertical direction Z. The lower face 10d is a lower side face of the second housing 10b.

The lower wall portion 10c has a cooling flow passage 90 through which refrigerant flows, which is provided inside the lower wall portion 10c. When viewed along the vertical direction Z, at least a portion of the cooling flow passage 90 overlaps the vertical-directional lower region of the accommodating portion 14. Here, as described above, the oil O is stored in the vertical-directional lower region within the accommodating portion 14. Therefore, by flowing refrigerant through the cooling flow passage 90 provided in the lower wall portion 10c facing the vertical-directional lower region within the accommodating portion 14, it is possible to cool the oil O stored in the accommodating portion 14. Due to the above, the oil O can be cooled without being drained out of the housing 10. Therefore, it can be suppressed that the structure of the motor 1 becomes complicated. Further, since there is no need to connect the flow passage used for draining the oil O to the housing 10, the housing 10 can be easily sealed.

As described above, according to an exemplary embodiment of the present disclosure, the motor 1 which is capable of suitably cooling the oil O stored in the housing 10 with a simple structure may be obtained. Due to the above, it is possible to suitably cool the stator 30, the rotor 20 and the like by using the cooled oil O. Refrigerant flowing through the cooling flow passage 90 is not particularly limited as long as it is fluid that may cool the oil O. Refrigerant may be water, liquid other than water, or gas.

Further, for example, instead of storing the oil O in the housing, it is conceivable that the flow passage extending in a circumferential direction on the radial-directional outer side of the stator is provided in the housing and the stator is directly cooled by refrigerant flowing in the flow passage. However, in this case, in order to sufficiently cool the stator, it is necessary to sufficiently increase the dimension in the circumferential direction of the flow passage to surround the stator. For this reason, it might have unfavorably taken time to fabricate the flow passage. Further, there were unfavorable cases in which it was difficult to cool the rotor by refrigerant flowing through the flow passage.

In this behalf, according to an exemplary embodiment of the present disclosure, the medium which cools the stator 30, the rotor 20 and the like is the oil O, and the cooling flow passage 90 is a flow passage which cools the oil O. Due to the above, the cooling flow passage 90 may be locally disposed with respect to a portion where the oil O is stored, so the cooling flow passage 90 may be easily fabricated. Furthermore, since the oil O is stored in the housing 10, it is easy to cool the rotor 20 by circulating the oil O in the housing 10. Furthermore, as shown in FIGS. 2 and 4, since a portion of the stator 30 may be immersed in the stored oil O, it is easier to cool the stator 30. In particular, since a portion of coil 32 that is a heating element may be immersed in the stored oil O and cooled, it is possible to suitably cool the stator 30.

In addition, in an exemplary embodiment of the present disclosure, the axial direction Y is orthogonal to the vertical direction Z. For this reason, for example, compared with the case where the axial direction Y is parallel to the vertical direction Z, a portion of the stator 30 which is immersed in the stored oil O can be easily enlarged, so it is easy to cool the stator 30. Further, the liquid surface OS of the oil O is easily disposed below the rotor 20 at least when the rotor 20 is rotated, and the oil O may be suppressed from becoming rotational resistance of the rotor 20 when the rotor 20 is being rotated.

As shown in FIG. 3, the cooling flow passage 90 extends in an undulated shape when viewed along the vertical direction Z. For this reason, it is easy to increase the portion of the cooling flow passage 90 that overlaps the vertical directional lower region in the accommodating portion 14 while reducing the flow passage sectional area of the cooling flow passage 90. In this way, the oil O can be suitably cooled by refrigerant flowing through the cooling flow passage 90.

The cooling flow passage 90 includes a plurality of first flow passage portions 91a, 91b, 91c, 91d, 91e, 91f, 91g, and 91h extending in the axial direction Y and a plurality of second flow passage portions 92a, 92b 92c, 92d, 92e, 92f, and 92g extending in the widthwise direction X. The plurality of first flow passage portions 91a~91h are disposed side by side in the widthwise direction X. The plurality of first flow passage portions 91a, 91b, 91c, 91d, 91e, 91f, 91g, and 91h are arranged in this order from one widthwise-directional side to the other widthwise-directional side. An end portion of the other axial-directional side of the first flow passage portion 91a is disposed on the other axial-directional side rather than end portions of the other axial-directional sides of the first flow passage portions 91b~91h.

End portions of one axial-directional sides of the first flow passage portions 91a~91h are disposed at the same position in the axial direction Y.

The second flow passage portion 92a connects the end portion of the one axial-directional side of the first flow passage portion 91a and the end portion of the one axial-directional side of the first flow passage portion 91b. The second flow passage portion 92b connects the end portion of the other axial-directional side of the first flow passage portion 91b and the end portion of the other axial-directional side of the first flow passage portion 91c. The second flow passage portion 92c connects the end portion of the one axial-directional side of the first flow passage portion 91c and the end portion of the one axial-directional side of the first flow passage portion 91d. The second flow passage portion 92d connects the end portion of the other axial-directional side of the first flow passage portion 91d and the end portion of the other axial-directional side of the first flow passage portion 91e. The second flow passage portion 92e connects the end portion of the one axial-directional side of the first flow passage portion 91e and the end portion of the one axial-directional side of the first flow passage portion 91f. The second flow passage portion 92f connects the end portion of the other axial-directional side of the first flow passage portion 91f and the end portion of the other axial-directional side of the first flow passage portion 91g. The second flow passage portion 92g connects the end portion of the one axial-directional side of the first flow passage portion 91g and the end portion of the one axial-directional side of the first flow passage portion 91h.

As described above, the plurality of first flow passage portions 91a~91h are connected to each other. For this reason, it is possible to configure the cooling flow passage 90 in an undulated shape while allowing refrigerant to flow in the first flow passage portions 91a~91h in the axial direction Y. Due to the above, a portion of the cooling flow passage 90 which overlaps the vertical-directional lower region in the accommodating part 14 may be easily enlarged in the axial direction Y, and it is possible to suitably cool the oil O by refrigerant flowing through the cooling flow passage 90. The directions of refrigerant flowing the first flow passage portions 91a~91h adjacent to each other in the widthwise direction X are opposite to each other.

The cooling flow passage 90 passes a lower side of the motor shaft 20a and is disposed over a range from one side of the motor shaft 20a to the other side of the motor shaft 20a in the widthwise direction X. Due to the above, a portion of the cooling flow passage 90 which overlaps the vertical-directional lower region in the accommodating part 14 may be easily enlarged in the widthwise direction X, and it is possible to suitably cool the oil O by refrigerant flowing through the cooling flow passage 90. In an exemplary embodiment of the present disclosure, the first flow passage portions 91c, 91d, 91e, and 91f and the second flow passage portions 92c, 92d, and 92e overlap with the motor shaft 20a when viewed along the vertical direction Z.

As shown in FIG. 4, an upper end portion of the first flow passage 91a, an upper end portion of the first flow passage 91b, an upper end portion of the first flow passage 91g, and an upper end portion of the first flow passage 91h are disposed at the same position in the vertical direction Z. An upper end portion of the first flow passage portion 91c and an upper end portion of the first flow passage portion 91f are disposed at the same position in the vertical direction Z, and disposed below the upper end portions of the first flow passage portions 91a, 91b, 91g, and 91h. An upper end portion of the first flow passage portion 91d and an upper end portion of the first flow passage portion 91e are disposed at the same position in the vertical direction Z, and disposed below the upper end portions of the first flow passage portions 91c and 91f.

For example, a center in the widthwise direction X between the first flow passage portion 91d and the first flow passage portion 91e, that is, a position in the widthwise direction X is the same as the central axis J1. In the first flow passage portions 91b~91g, an upper end portion of each first flow passage portion is positioned as down as the first flow passage portion whose position in the widthwise direction X is close to the central axis J1. The upper end portions of the plurality of first flow passage portions 91a~91h are disposed along the radial-directional outer face of the stator 30 when viewed along the axial direction Y. Due to the above, the first flow passage portions 91a~91h may be easily brought close to the stator 30. Therefore, by refrigerant flowing through the first flow passage portions 91a~91h, therefore, it is easier to cool the oil O stored in the accommodating portion 14 in which the stator 30 is accommodated. In addition, it is easy to directly cool the stator 30 by refrigerant flowing through the first flow passage portions 91a~91h.

Lower end portions of the plurality of first flow passage portions 91a~91h are disposed at the same position in the vertical direction Z. The lower end portions of the plurality of first flow passage portions 91a~91h are disposed along the lower face 10d which is a lower face of the lower wall portion 10c. Due to the above, the first flow passage portions 91a~91h may be disposed close to the lower face 10d, and the flow passage cross-sectional areas of the first flow passage portions 91a~91h can be easily increased. Therefore, the flow rate of refrigerant flowing through the first flow passage portions 91a~91h may be increased to suitably cool the oil O.

The dimension in the vertical direction Z of the first flow passage portion 91a, the dimension in the vertical direction Z of the first flow passage portion 91b, the dimension in the vertical direction Z of the first flow passage portion 91g, and the vertical direction Z of the first flow passage portion 91h are the same as each other. The dimension in the vertical direction Z of the first flow passage portion 91c and the dimension in the vertical direction Z of the first flow passage portion 91f are the same as each other, and are smaller than the dimensions in the vertical direction Z of the first flow passage portions 91a, 91b, 91g, 91h. The dimension in the vertical direction Z of the first flow passage portion 91d and the dimension in the vertical direction Z of the first flow passage portion 91e are the same as each other, and are smaller than the dimensions in the vertical direction Z of the first flow passage portions 91c, 91f.

The dimension in the widthwise direction X of the first flow passage portion 91a is the same as the dimension in the widthwise direction X of the first flow passage portion 91h. The dimension in the widthwise direction X of the first flow passage portion 91b is the same as the dimension in the widthwise direction X of the first flow passage portion 91g. The dimension in the widthwise direction X of the first flow passage portion 91c is the same as the dimension in the widthwise direction X of the first flow passage portion 91f. The dimension in the widthwise direction X of the first flow passage portion 91d and the dimension in the widthwise direction X of the first flow passage portion 91e are the same.

The dimensions in the widthwise direction X of the first flow passage portions 91b, 91g are smaller than the dimensions in the widthwise direction X of the first flow passage portions 91a, 91h. The dimensions in the widthwise direction X of the first flow passage portions 91c, 91f are larger than the dimensions in the widthwise direction X of the first flow passage portions 91b, 91g. The dimensions in the widthwise direction X of the first flow passage portions 91d, 91e are larger than the dimensions in the widthwise direction X of the first flow passage portions 91c, 91f.

In the pair of first flow passage portions 91b, 91c adjacent to each other in the widthwise direction X, the one first flow passage portion 91c whose position in the widthwise direction X is closer to the central axis J1 has the dimension in the vertical direction Z smaller than that of the other first flow passage portion 91b and the dimension in the widthwise direction X larger than that of the other first flow passage portion 91b. This dimensional relationship applies equally to the pair first flow passage portion 91c, 91d adjacent to each other in the widthwise direction X, the pair first flow passage portion 91e, 91f adjacent to each other in the widthwise direction X, and the pair first flow passage portion 91f, 91g adjacent to each other in the widthwise direction X. With such the dimensional relationship, when the vertical-directional positions of the lower end portions of the first flow passage portions 91b~91g are aligned and the upper end portions of the first flow passage portions 91b~91g are along the radial-directional outer face of the stator 30, it is easy to make the flow passage cross-sectional areas of the first flow passage portions 91b~91g the same. Therefore, it is easy to stabilize the flow of refrigerant flowing through the first flow passage portions 91b~91g, so the cooling efficiency of the oil O obtained by refrigerant may be enhanced.

In addition, the comparison of the dimension in the vertical direction Z in each first flow passage portion described above is, for example, the comparison of the largest dimensions among the dimensions in the vertical direction Z in each first flow passage portion. The comparison of the dimension in the widthwise direction X in each first flow passage portion described above is, for example, the comparison of the largest dimensions among the dimensions in the widthwise direction X in each first flow passage portion.

As shown in FIG. 2, the cooling flow passage 90 overlaps the stator 30 and the rotor 20 when viewed along the vertical direction Z. An end portion of one axial-directional side of the cooling flow passage 90 is located at one axial-directional side of the bearing 70. When viewed along the vertical direction Z, the end portion on the other axial-directional side of the cooling flow passage 90 overlaps a stator core 31 described later.

In an exemplary embodiment of the present disclosure, the cooling flow passage 90 is disposed between the first housing 10a and the second housing 10b in the vertical direction Z. Due to the above, the cooling flow passage 90 may be configured by fixing the second housing 10b with respect to the first housing 10a. Due to the above, for example, as compared with the case where the cooling flow passage is fabricated within a single member, it is easy to fabricate the cooling flow passage 90.

In an exemplary embodiment of the present disclosure, as described above, the first contact face 11e and the second contact face 10e are flat faces. For that reason, when the first housing 10a and the second housing 10b are fixed, it is easy to seal a region between the first housing 10a and the second housing 10b. Therefore, when the cooling flow passage 90 is provided between the first housing 10a and the second housing 10b in the vertical direction Z, it is easy to seal the cooling flow passage 90, so leakage of refrigerant may be suppressed. For example, a seal member which is not shown and seals between the first contact face 11e and the second contact face 10e is provided between the first contact face 11e and the second contact face 10e.

As shown in FIG. 4, in an exemplary embodiment of the present disclosure, a first groove portion 90a which is concaved upward from the first contact face 11e and a second groove portion 90b which is concaved downward from the second contact face 10e are connected in the vertical direction Z to configure the cooling flow passage 90. For that reason, the cooling flow passage 90 may be provided across both the first housing 10a and the second housing 10b, so it is easy to enlarge the flow passage cross-sectional area of the cooling flow passage 90. Due to the above, it is easy to increase the flow rate of refrigerant flowing through the cooling flow passage 90, and it is easier to cool the oil O. In addition, the first housing 10a has the first groove portion 90a. The second housing 10b has the second groove portion 90b.

The first groove portion 90a constitutes an upper part of the cooling flow passage 90. A width of the first groove portion 90a is decreased from a lower side towards an upper side. For the reason, a shape of the first groove portion 90a may be extracted to form a tapered shape. Due to the above, for example, when the first housing 10a is fabricated by die casting, it is easy to extract a mold from the first groove 90a. Therefore, it is possible to easily fabricate the first groove portion 90a. Since the width of the first groove portion 90a is decreased from the lower side toward the upper side, the dimensions in the widthwise direction X of the upper portions of the first flow passage portions 91a~91h are also decreased from the lower side toward the upper side.

The second groove 90b constitutes a lower part of the cooling flow passage 90. A width of the second groove portion 90b is decreased from an upper side toward a lower side. For that reason, a shape of the second groove portion 90b may be made into a shape having a cutout taper shape. Due to the above, for example, when the second housing 10b is fabricated by die casting, it is easy to extract a mold from the second groove portion 90b. Therefore, it is possible to easily fabricate the second groove portion 90b. Since the width of the second groove portion 90b is decreased from the upper side toward the lower side, the dimensions in the widthwise direction X of the lower portions of the first flow passage portions 91a~91h are also decreased from the upper side toward the lower side. A dimension in the vertical direction Z of the second groove portion 90b is smaller than a dimension in the vertical direction Z of the first groove portion 90a.

As shown in FIG. 3, the cooling flow passage 90 has an inflow flow passage 93 and an outflow flow passage 94. The inflow flow passage 93 extends in the widthwise direction X from a face of the other widthwise-directional side of the flow passage forming portion 11d to an end portion of the other axial-directional side of the first flow passage portion 91a. An opening of the other widthwise-directional side of the inflow flow passage 93 is an inlet 93a into which refrigerant flows. That is, the cooling flow passage 90 has the inlet 93a. The inlet 93a is opened to the face of the other widthwise-directional side of the flow passage forming portion 11d. As shown in FIG. 1, an inflow nozzle portion 15 protruding from the flow passage forming portion 11d to the other widthwise-directional side is installed on the inlet 93a.

As shown in FIG. 3, the outflow flow passage 94 extends in the widthwise direction X from the face of the other widthwise-directional side of the flow passage forming portion 11d to an end portion of one axial-directional side of the first flow passage portion 91h. An opening of the other widthwise-directional side of the outflow flow passage 94 is an outlet 94a through which refrigerant flows out. That is, the cooling flow passage 90 has the outlet 94a. The outlet 94a is opened to the face of the other widthwise-directional side of the flow passage forming portion 11d. As shown in FIG. 1, an outflow nozzle portion 16 protruding from the flow passage forming portion 11d to the other widthwise-directional side is installed on the outlet 94a.

As described above, the inlet 93a and the outlet 94a are opened in the widthwise direction X. For that reason, as compared with the case where the inlet and the outlet are opened in the axial direction Y or the vertical direction Z, it is easy to form the inlet 93a and the outlet 94. In an exemplary embodiment of the present disclosure, since the inlet 93a and the outlet 94a are formed on the same side in the widthwise direction X of the housing 10, the inflow and outflow of the refrigerant to and from the cooling flow passage 90 may be facilitated. A vertical directional position of the inlet 93a is the same as a vertical directional position of the outlet 94a.

As shown in FIG. 2, the inflow flow passage 93 is provided away upward from the second housing 10b. Moreover, although omitted in the drawings, the outflow flow passage 94 is provided away upward from the second housing 10b. Due to the above, as shown in FIG. 1, the inlet 93a and the outlet 94a are provided on the first housing 10a and away upward from the second housing 10b, respectively. Since, due to the above, the inlet 93a and the outlet 94a do not straddle the first housing 10a and the second housing 10b, it is easy to suppress leakage of refrigerant flowing into the inlet 93a and refrigerant discharged from the outlet 94a. As shown in FIG. 2, a flow passage cross-section of the inflow flow passage 93 has a circular shape. Although omitted in the drawing, a flow passage cross-section of the outflow flow passage 94 has a circular shape.

Refrigerant flowing into the inflow passage 93 from the inflow nozzle portion 15 through the inlet 93a flows from the first flow passage portion 91h into the outflow flow passage 94 via the first flow passage portions and the second flow passage portions in turn from the first flow passage portion 91a. In addition, refrigerant that has flowed into the outflow flow passage 94 flows out of the cooling flow passage 90 from the outflow nozzle portion 16 through the outlet 94a. In this way, refrigerant is circulated in the cooling flow passage 90.

As shown in FIG. 2, the housing 10 includes a first oil passage 61 and a third oil passage 63. The first oil passage 61 is provided in the outer lid portion 13. More specifically, the first oil passage 61 is provided in the plug body portion 13b. Due to the above, a configuration of the first oil passage 61 may be easily modified by replacing the plug body portion 13b. The first oil passage 61 is disposed on the one axial-directional side of the pump chamber 46. On the one axial-directional side of the pump chamber 46, the first oil passage 61 connects an upper end portion of the pump chamber 46 and a central portion of the pump chamber 46. A portion of the first oil passage 61 connected to the pump chamber 46 is opened to a face of the other axial-directional side of the plug body portion 13b.

In the pump chamber 46, the upper end portion connected to the first oil passage 61 is a discharge port 45. That is, the first oil passage 61 is connected to the discharge port 45. In the pump chamber 46, the central portion connected to the first oil passage 61 is a connection port 61a. As shown in FIG. 5, the discharge port 45 and the connection port 61a have, for example, a circular shape. The discharge port 45 is disposed above the connection port 61a. The central axis J1 passes through the connection port 61a.

As shown in FIG. 2, the third oil passage 63 extends upward from the opening 12f. The third oil passage 63 is connected to the vertical-directional lower region in the accommodating portion 14 through the opening 12f. An upper end portion of the third oil passage 63 is connected to the pump chamber 46 on the other axial-directional side of the pump chamber 46. A portion of the pump chamber 46 to which the third oil passage 63 is connected is a suction port 44. That is, the third oil passage 63 connects the suction port 44 and the vertical-directional lower region in the accommodating portion 14. As shown in FIG. 5, the suction port 44 has, for example, a circular shape. The suction port 44 is disposed below the discharge port 45 and the connection port 61a. The suction port 44 is disposed below the central axis J1.

As shown in FIG. 2, the third oil passage 63 has a first portion 63a, a second portion 63b, and a third portion 63c. The first portion 63a extends upward from the opening 12f. An upper end portion of the first portion 63a is positioned above an inner circumferential surface of a lower end portion of the inner cylinder portion 12c. The first portion 63a is, for example, configured by closing a groove, which is concaved from a face of the other axial-directional side of the lid plate portion 13c to one axial-directional side and extends in the vertical direction Z, with the face of one axial-directional side of the annular plate portion 12a. As a result, the first portion 63a is disposed between the inner lid portion 12 and the outer lid portion 13 in the axial direction Y.

The second portion 63b extends from the upper end portion of the first portion 63a to the other axial-directional side. The second portion 63b is configured by closing a groove, which is concaved upward from a lower side face of the protruding portion 13d and extends in the other axial-directional side, with an inner circumferential surface of the inner cylinder portion 12c. As a result, the second portion 63b is disposed between the inner lid portion 12 and the outer lid portion 13 in the radial direction.

The third portion 63c extends upward from an end portion of the other axial-directional side of the second portion 63b. The third portion 63c is provided on the protruding portion 13d. The third portion 63c is provided at a radial-directional inner side of the inner cylinder portion 12c. The third portion 63c is connected to the suction port 44. According to an exemplary embodiment of the present disclosure, at least a part of the third oil passage 63 is disposed between the inner lid portion 12 and the outer lid portion 13 in the axial direction Y. For that reason, at least a part of the third oil passage 63 may be configured by the inner lid portion 12 and the outer lid portion 13 fixed to each other, and the third oil passage 63 may be easily fabricated.

The rotor 20 includes the motor shaft 20a, a rotor core 22, a magnet 23, a first end plate 24, and a second end plate 25. The motor shaft 20a includes a motor shaft main body 21 and an attachment member 50. The motor shaft main body 21 has a cylindrical shape extending in the axial direction Y. The motor shaft main body 21 includes a large-diametered portion 21a, a first medium-diametered portion 21b, a second medium-diametered portion 21c, a small-diameter portion 21d, and an output portion 21e.

The large-diametered portion 21a is a portion to which the rotor core 22 is attached. A male screw portion is provided on an outer circumferential surface of end portion of one axial-directional side of the large-diametered portion 21a. A nut 72 is fastened to the male screw portion of the large-diametered portion 21a. The first medium-diametered portion 21b is connected to the large-diametered portion 21a at the one axial-directional side of the large-diametered portion 21a. An outer diameter of the first medium-diametered portion 21b is smaller than an outer diameter of the large-diametered portion 21a. An end portion of the other axial-directional side of the first medium-diameter portion 21b is rotatably supported by the bearing 70.

The second medium-diametered portion 21c is connected to the large-diametered portion 21a at the other axial-directional side of the large-diametered portion 21a. An outer diameter of the second medium-diametered portion 21c is smaller than the outer diameter of the large-diametered portion 21a. An end portion of one axial-directional side of the second medium-diameter portion 21c is rotatably supported by the bearing 71. The bearings 70 and 71 rotatably support the motor shaft 20a. The bearings 70 and 71 are, for example, ball bearings.

The small-diametered portion 21d is connected to the first medium-diameter portion 21b at the one axial-directional side of the first medium diameter portion 21b. An end portion of one axial-directional side of the small-diametered portion 21d is an end portion of one axial-directional side of the motor shaft main body 21. The end portion of one axial-directional side of the small-diametered portion 21d is disposed on the radial-directional inner side of the inner cylinder portion 12c. An outer diameter of the small-diametered portion 21d is smaller than an outer diameter of the first medium-diametered portion 21b. That is, the small-diametered portion 21d is a portion whose outer diameter is decreased toward one axial-directional side.

The output portion 21e is connected to the second medium-diametered portion 21c at the other axial-directional side of the second medium-diametered portion 21c. The output portion 21e is an end portion of the other axial-directional side of the motor shaft main body 21. An outer diameter of the output portion 21e is smaller than the outer diameter of the small-diametered portion 21d. The output portion 21e passes through the bottom portion 11a in the axial direction Y and protrudes outside the housing 10.

The motor shaft main body 21 has a flange portion 21f. The flange portion 21f protrudes radially outward from the outer circumferential surface of the large-diametered portion 21a. The flange portion 21f has an annular plate shape which is provided over one turn of the outer circumferential surface of the large diametered-portion 21a. The flange portion 21f is provided on an end portion of the other axial-directional side of the large-diametered portion 21a. The motor shaft main body 21 has a hole portion 21g extending from an end portion of the one axial-directional side of the motor shaft main body 21 to the other axial-directional side. The hole portion 21g is a bottomed hole that is opened to one axial-directional side. That is, an end portion of the other axial-directional side of the hole portion 21g is closed.

The attachment member 50 is fixed to the one axial-directional side of the motor shaft main body 21. The attachment member 50 is fitted into and fixed to the hole portion 21g. The attachment member 50 has a cylindrical shape that is opened to both axial-directional sides. In an exemplary embodiment of the present disclosure, the attachment member 50 has a cylindrical shape centered on the central axis J1. The attachment member 50 extends to one axial-directional side of the motor shaft main body 21 and passes through the second through-hole 13f.

The attachment member 50 includes a fitting portion 51 and a fixing portion 52. The fitting portion 51 is a portion fitted into the hole portion 21g. The fitting portion 51 is fixed to an inner circumferential surface of an end portion on one axial-directional side of the hole portion 21g, and extends from the inside of the hole portion 21g to one axial-directional side of the motor shaft main body 21. One end portion of one axial-directional side of the fitting portion 51 is inserted into the second through-hole 13f. That is, at least a portion of the fitting portion 51 is inserted into the second through-hole 13f. For that reason, it is possible to enlarge a radial-directional gap between an outer circumferential surface of the attachment member 50 and an inner circumferential surface of the second through-hole 13f. Due to the above, even when the position of the attachment member 50 is deviated in the radial direction by vibration etc., it is possible to suppress the attachment member 50 from being in contact with the inner circumferential surface of the second through-hole 13f.

The fixing portion 52 is located on the one axial-directional side of the fitting portion 51. The fixing portion 52 is connected to the one end portion of the one axial-directional side of the fitting portion 51. An outer diameter of the fixing portion 52 is larger than an outer diameter of the fitting portion 51, and is smaller than an inner diameter of the second through-hole 13f. The fixing portion 52 is inserted into the pump chamber 46. An inner diameter of the fitting portion 51 and an inner diameter of the fixing portion 52 are, for example, the same.

The external gear 42 described later is fixed to the attachment member 50. In an exemplary embodiment of the present disclosure, the external gear 42 is fixed to a radial-directional outer face of the fixing portion 52. More specifically, the fixing portion 52 is fitted into and fixed to a fixing hole portion 42b through which the external gear 42 passes in the axial direction Y. Like this, according to an exemplary embodiment of the present disclosure, the fitting portion 51 having the outer diameter smaller than that of the fixing portion 52 is fitted into the hole portion 21g, and the external gear 42 is fixed to the fixing portion 52 having the outer diameter larger than that of the fitting portion 51. For this reason, the hole portion 21g may be configured such that an inner diameter thereof is smaller than an inner diameter of the fixing hole portion 42b of the external gear 42. Due to the above, it is easy to make the inner diameter of the hole portion 21g comparatively small, and it is possible to suppress rigidity of the motor shaft main body 21 from being degraded.

The motor shaft 20a has a second oil passage 62 provided inside the motor shaft 20a. The second oil passage 62 is a bottomed hole that extends concavely from an end portion of the one axial-directional side of the motor shaft 20a to the other axial-directional side. The second oil passage 62 is opened towards one axial-directional side. The second oil passage 62 extends from an end portion of one axial-directional side of the attachment member 50 to an end portion of the other axial-directional side of the second medium-diametered portion 21c, and is provided across the attachment member 50 and the motor shaft main body 21. The second oil passage 62 is configured by connecting the inside of the attachment member 50 and the hole portion 21g in the axial direction Y. That is, a radial-directional inner side face of the attachment member 50 constitutes a portion of the radial-directional inner side face of the second oil passage 62.

In an exemplary embodiment of the present disclosure, in the cross-section orthogonal to the axial direction Y, an inner edge of the second oil passage 62 has a circular shape centered on the central axis J1. In the second oil passage 62, an inner diameter of a portion provided on the attachment member 50 is smaller than an inner diameter of a portion provided on the motor shaft main body 21. That is, the inner diameter of the attachment member 50 is smaller than the inner diameter of the hole portion 21g. By connecting an opening of the one axial-directional side of the attachment member 50 to the connection port 61a, the second oil passage 62 is connected to the first oil passage 61 through the inside of the attachment member 50. That is, the second oil passage 62 is opened to the first oil passage 61 at the end portion of one axial-directional side of the motor shaft 20a.

Figure 6:
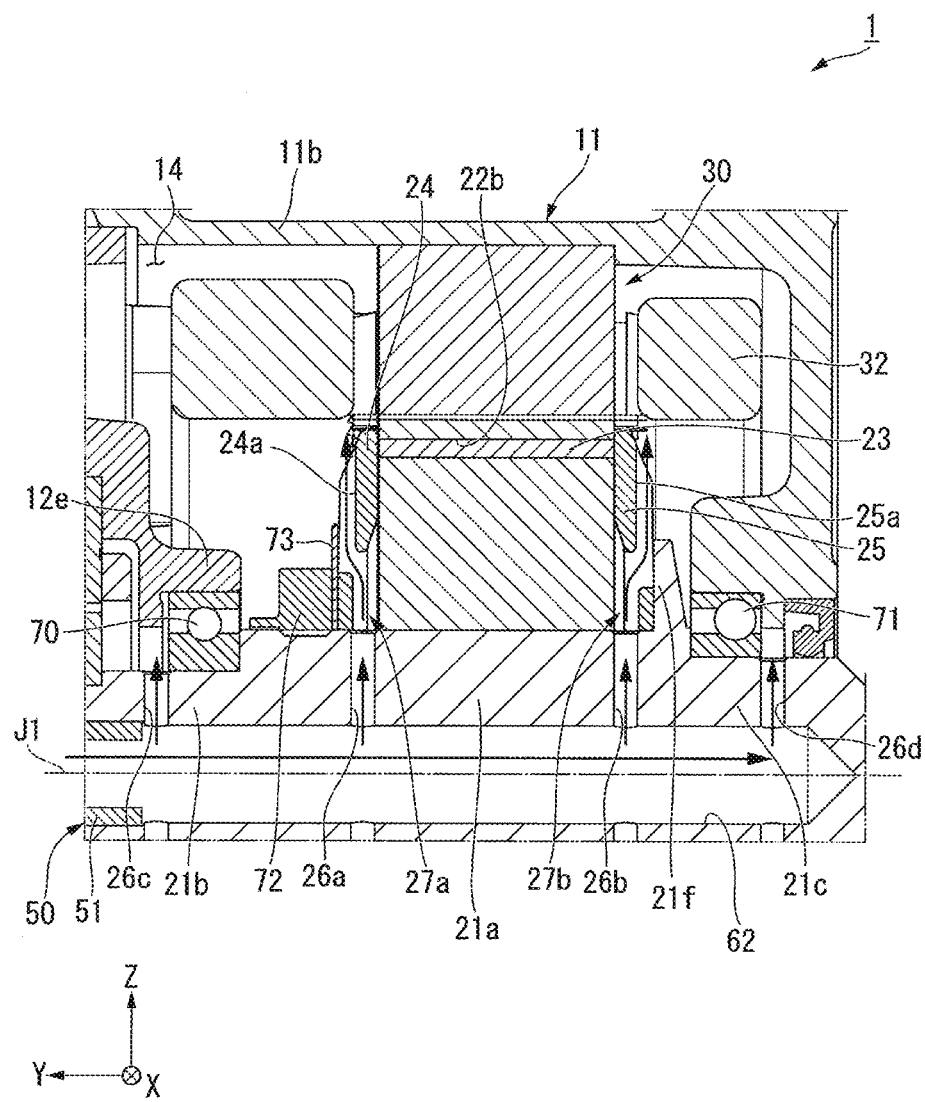
FIG. 6 is a cross-sectional view showing a part of the motor of an exemplary embodiment of the present disclosure.

The motor shaft 20a has first through-holes 26a~26d that connect the second oil passage 62 and an outer circumferential surface of the motor shaft 20a. The first through-holes 26a~26d extend in the radial direction. The first through-holes 26a, 26b are provided on the large-diametered portion 21a. The first through-holes 26a, 26b are disposed between the nut 72 and the flange portion 21f in the axial direction Y. As shown in FIG. 6, an end portion of a radial-directional outer side of the first through-hole 26a is opened to a gap 27a in the axial direction Y of the first end plate 24 and the rotor core 22. An end portion of a radial-directional outer side of the first through-hole 26b is opened to a gap 27b in the axial direction Y of the second end plate 25 and the rotor core 22.

The first through-hole 26c is provided in the first medium-diametered portion 21b. An end portion of a radial-directional outer side of the first through-hole 26c is opened to a radial-directional inner side of the bearing holding portion 12e at one axial-directional side of the bearing 70. The first through-hole 26d is provided in the second medium-diametered portion 21c. An end portion of a radial-directional outer side of the first through-hole 26d is opened to a radial-directional inner side of the bearing holding portion 11c at the other axial-directional side of the bearing 71. For example, each of a plurality of first through-holes 26a~26d is provided in the circumferential direction.

As shown in FIG. 2, the rotor core 22 has an annular shape fixed to the motor shaft main body 21. In an exemplary embodiment of the present disclosure, the rotor core 22 is fitted into the large-diametered portion 21a. The rotor core 22 has a magnet inserting hole 22b that passes through the rotor core 22 in the axial direction Y. A plurality of magnet inserting holes 22b are formed in the circumferential direction. The magnet 23 is inserted into the magnet inserting hole 22b.

The first end plate 24 and the second end plate 25 have an annular plate shape that expands in the radial direction. The large-diametered portion 21a passes through the first end plate 24 and the second end plate 25. The rotor core 22 is sandwiched between the first end plate 24 and the second end plate 25 in the axial direction Y in a state in which the end platers are in contact with the rotor core 22.

As shown in FIG. 6, the first end plate 24 is disposed on one axial-directional side of the rotor core 22. A radial-directional outer edge of the first end plate 24 protrudes to the other axial-directional side, and is in contact with a radial-directional outer edge of a face of the one axial-directional side of the rotor core 22. The radial-directional outer edge of the first end plate 24 overlaps an opening of one axial-directional side of the magnet inserting hole 22b in the axial direction Y, and presses the magnet 23 inserted into the magnet inserting hole 22b from one axial-directional side. A radial-directional inner portion, rather than a radial-directional outer edge of the first end plate 24, faces a face of the one axial-directional side of the rotor core 22 in the axial direction Y via the gap 27a.

The first end plate 24 has a jet groove 24a which is concaved from a face of one axial-directional side of the first end plate 24 towards the other axial-directional side. The jet groove 24a extends in the radial direction. An end portion of a radial-directional inner side of the jet groove 24a passes through the first end plate 24 in the axial direction Y and is connected to the gap 27a. An end portion of a radial-directional outer side of the jet groove 24a is opened to a radial-directional outer side of the first end plate 24, and faces a coil 32, which will be described later, in the radial direction via the gap. In a portion of the radial-directional inner side of the jet groove 24a, an opening of one axial-directional side is closed by a washer 73 which is sandwiched and fixed between the nut 72 and the first end plate 24 in the axial direction Y. The washer 73 has an annular plate shape that expands in the radial direction.

The second end plate 25 is disposed on the other axial-directional side of the rotor core 22. A radial-directional outer edge of the second end plate 25 protrudes to one axial-directional side, and is in contact with a radial-directional outer edge of a face of the other axial-directional side of the rotor core 22. A radial-directional outer edge of the second end plate 25 overlaps an opening of the other axial-directional side of the magnet inserting hole 22b in the axial direction Y, and presses the magnet 23 inserted into the magnet inserting hole 22b from the other axial-directional side. Due to the above, both sides in the axial direction Y of the magnet 23 inserted into the magnet inserting hole 22b are pressed by the first end plate 24 and the second end plate 25. Therefore, it is possible to suppress the magnet 23 from being extracted from the magnet inserting hole 22b.

A radial-directional inner portion, rather than a radial-directional outer edge of the second end plate 25, faces a face of the other axial-directional side of the rotor core 22 in the axial direction Y via the gap 27b. The second end plate 25 has a jet groove 25a which is concaved from a face of the other axial-directional side of the second end plate 25 towards one axial-directional side. The jet groove 25a extends in the radial direction. An end portion of a radial-directional inner side of the jet groove 25a passes through the second end plate 25 in the axial direction Y and is connected to the gap 27b. An end portion of a radial-directional outer side of the jet groove 25a is opened to a radial-directional outer side of the second end plate 25, and faces the coil 32, which will be described later, in the radial direction via the gap. In a portion of the radial-directional inner side of the jet groove 25a, an opening of the other axial-directional side is closed by the flange portion 21f.

The first end plate 24, the rotor core 22, and the second end plate 25 are sandwiched in the axial direction Y by the nut 72, the washer 73, and the flange portion 21f. By fastening the nut 72 to the male screw portion of the large-diametered portion 21a, the nut 72 presses the first end plate 24, the rotor core 22, and the second end plate 25 against the flange portion 21f via the washer 73. Due to the above, the first end plate 24, the rotor core 22, and the second end plate 25 are fixed to the motor shaft 20a.

The rotation detector 80 shown in FIG. 2 detects rotation of the rotor 20. In an exemplary embodiment of the present disclosure, the rotation detector 80 is, for example, a variable reluctance (VR) type resolver. The rotation detector 80 is disposed on a radial-directional inner side of the inner cylinder portion 12c. The rotation detector 80 includes a detection-object part 81 and a sensor part 82.

The detection-object part 81 has an annular shape extending in the circumferential direction. The detection-object part 81 is fitted and fixed to the motor shaft 20a. More specifically, the detection-object part 81 is fitted and fixed to the small-diametered portion 21d. In a radial-directional inner edge of the detection-object part 81, a face of the other axial-directional side is in contact with a stepped region between the first medium-diametered portion 21b and the small-diametered portion 21d. The detection-object part 81 overlaps the attachment member 50 in the radial direction. For that reason, as compared with a case where the detection-object part 81 and the attachment member 50 are disposed apart from each other in the axial direction Y without overlapping in the radial direction, the motor shaft 20a may be easily downsized in the axial direction Y. The detection-object part 81 is made of a magnetic material.

Furthermore, in the present specification, the expression "some objects overlap each other in a certain direction" includes that certain objects overlap each other when viewed along a certain direction. That is, the expression "the detection-object part 81 overlaps the attachment member 50 in the radial direction" includes that the detection-object part 81 overlaps the attachment member 50 when viewed along the radial direction.

The sensor part 82 is disposed between the inner lid portion 12 and the outer lid portion 13 in the axial direction Y. More specifically, on the radial-directional inner side of the inner cylinder portion 12c, the sensor part 82 is fixed to the face of the one axial-directional side of the inner cylinder bottom portion 12d. That is, the sensor part 82 is attached to the inner lid portion 12. As a result, it is easy to attach the sensor part 82. The sensor part 82 is disposed in the second concavity portion 12g. For that reason, after attaching the inner lid portion 12 to the main body portion 11, the sensor part 82 may be inserted into the second concavity portion 12g from an opening of the one axial-directional side of the second concavity portion 12g and be then disposed. Therefore, it is easy to dispose the sensor part 82.

The sensor part 82 has an annular shape that surrounds an axial-directional outer side of the detection-object part 81. The sensor part 82 has a plurality of coils in the circumferential direction. When the detection-object part 81 is rotated together with the motor shaft 20a, an induced voltage corresponding to a circumferential-directional position of the detection-object part 81 is generated in the coil of the sensor part 82. The sensor part 82 detects the induced voltage to detect rotation of the detection-object part 81. Due to the above, the rotation detector 80 detects rotation of the motor shaft 20a to detect rotation of the rotor 20.

The stator 30 faces the rotor 20 in the radial direction via the gap. The stator 30 includes the stator core 31 and a plurality of coils 32 mounted to the stator core 31. The stator core 31 has an annular shape centered on the central axis J1. An outer circumferential surface of the stator core 31 is fixed to an inner circumferential surface of the main body cylindrical portion 11b. The stator core 31 faces a radial-directional outer side of the rotor core 22 via the gap.

In an exemplary embodiment of the present disclosure, a radial-directional outer face of the stator 30 corresponds to a radial-directional outer face of the stator core 31. As shown in FIG. 4, the stator core 31 includes an annular shaped stator core main body 31a, a first stator core protruding portion 31b, and a second stator core protruding portion which is not shown. The first stator core protruding portion 31b and the second stator core protruding portion protrude from the stator core main body 31a to a radial-directional outer side. The first stator core protruding portion 31b is provided on both widthwise-directional sides of a lower portion of the stator core main body 31a, respectively. The second stator core protruding portions are provided on both widthwise-directional sides of an upper portion of the stator core main body 31a, respectively. A screw fastened to the housing 10 passes through the first stator core protruding portion 31b and the second stator core protruding portion. Due to the above, the stator core 31 is fixed to the housing 10.

A lower end portion of the first stator core protruding portion 31b is a flat portion orthogonal to the vertical direction Z. A lower face of the first stator core protruding portion 31 b is included in the radial-directional outer face of the stator core 31. The first stator core protruding portion 31b overlaps the first flow passage portions 91a, 91b, 91g, 91h when viewed along the vertical direction Z. The upper end portions of the first flow passage portions 91a, 91b, 91g, 91h are disposed along the lower face of the first stator core protruding portion 31b. The second stator core protruding portion has the same shape as the first stator core protruding portion 31b except that the second stator core protruding portion is reversed in the vertical direction Z.

A lower face of portion 31c of the stator core main body 31a positioned between the pair of first stator core protruding portions 31b in the widthwise direction X is positioned below the first stator core protruding portion 31b. The lower face of the portion 31c is included in the radial-directional outer face of the stator core 31. The portion 31c overlaps the first flow passage portions 91c–91f when viewed along the vertical direction Z. The upper end portions of the first flow passage portions 91c–91f are disposed along the lower face of the portion 31c.

The pump part 40 is provided at a central portion of the outer lid portion 13. The pump part 40 is disposed at the one axial-directional side of the motor shaft 20a. The pump part 40 includes the external gear 42, the internal gear 43, the above-described pump chamber 46, the suction port 44, the discharge port 45, and a storage portion 48. The external gear 42 is a gear which may be rotated around the central axis J1. The external gear 42 is fixed to an end portion of the one axial-directional side of the motor shaft 20a. More specifically, the external gear 42 is fixed to an outer circumferential surface of the fixing portion 52. As a result, the external gear 42 may be fixed to the motor shaft main body 21 via the attachment member 50. Due to the above, by adjusting the dimension of the attachment member 50, it is possible to fix the external gear 42 to the motor shaft main body 21 without modifying the dimension of the motor shaft main body 21 and the dimension of the external gear 42.

The external gear 42 is accommodated in the pump chamber 46. As shown in FIG. 5, the external gear 42 has a plurality of tooth portions 42a on an outer circumferential surface thereof. A tooth profile of the tooth portion 42a of the external gear 42 is the trochoidal tooth shape.

The internal gear 43 is an annular gear which is rotatable around a rotational axis J2 that is eccentric with respect to the central axis J1. The internal gear 43 is accommodated in the pump chamber 46. The internal gear 43 surrounds a radial-direction outer side of the external gear 42 and is engaged with the external gear 42. The internal gear 43 has a plurality of tooth portions 43a on an inner circumferential surface. The tooth profile of the tooth portion 43a of the internal gear 43 is a trochoidal tooth profile. As described above, since the tooth profile of the tooth portion 42a of the external gear 42 and the tooth profile of the tooth portion 43a of the internal gear 43 are the trochoidal tooth profile, a trochoid pump may be configured. Therefore, it is possible to reduce noise generated from the pump part 40, it is easy to stabilize the pressure and amount of the oil O discharged from the pump part 40.

In an exemplary embodiment of the present disclosure, after the internal gear 43 and the external gear 42 are inserted from the opening of one axial-directional side of the first concavity portion 13e, the opening of one axial-directional side of the first concavity portion 13e is closed by the plug body portion 13b, so the pump chamber 46 may be configured, and the internal gear 43 and the external gear 42 may be accommodated in the pump chamber 46. For that reason, the pump part 40 may be easily assembled.

As described above, the suction port 44 is connected to the third oil passage 63. As shown in FIG. 2, the suction port 44 is opened to the other axial-directional side of the pump chamber 46. The suction port 44 is connected to a gap between the external gear 42 and the internal gear 43. The suction port 44 may suction the oil O, which is stored in the accommodating portion 14, into the pump chamber 46, more specifically, into a gap between the external gear 42 and the internal gear 43 via the opening 12f and the third oil passage 63. As shown in FIG. 5, the suction port 44 is disposed above a lower end portion of the storage portion 48 and above a lower end portion of the external gear 42.

As described above, the discharge port 45 is connected to the first oil passage 61. As shown in FIG. 2, the discharge port 45 is opened to the one axial-directional side of the pump chamber 46. The discharge port 45 is connected to a gap between the external gear 42 and the internal gear 43. The discharge port 45 may discharge the oil O from the inside of the pump chamber 46, more specifically, from the gap between the external gear 42 and the internal gear 43.

On one radial-directional side of a vertical-directional lower region of the pump chamber 46, the storage portion 48 is connected to the pump chamber 46. As shown in FIG. 5, the shape of the storage portion 48 is an arcuate shape which is convex downward when viewed in the axial direction. Some of the oil O suctioned into the pump chamber 46 from the suction port 44 flows into the storage portion 48.

Since the suction port 44 is disposed above the lower end of the storage portion 48, even when operation of the pump part 40 is stopped, at least some of the oil O which has flowed into the storage portion 48 is not returned to the accommodating portion 14 from the suction port 44, but is stored in the storage portion 48. Due to the above, when the pump part 40 is stopped, a lower portion of the external gear 42 and a lower portion of the internal gear 43, which are in the pump chamber 46, may be brought into contact with the oil O in the storage portion 48. Therefore, when the pump part 40 is driven again, it is possible to intervene the oil O between the tooth portion 42a of the external gear 42 and the tooth portion 43a of the internal gear 43, and between an inner circumferential surface of the pump chamber 46 and an outer circumferential surface of the internal gear 43, so it can be suppressed that burning occurs.

When the motor shaft 20a is rotated by rotation of the rotor 20, the external gear 42 fixed to the motor shaft 20a is rotated. Due to the above, the internal gear 43 engaged with the external gear 42 is rotated, and the oil O suctioned from the suction port 44 into the pump chamber 46 is forwarded to the discharge port 45 through a gap between the external gear 42 and the internal gear 43. In this way, the pump part 40 is driven via the motor shaft 20a. The oil O discharged from the discharge port 45 flows into the first oil passage 61 and flows into the second oil passage 62 from the connection port 61a. As indicated by an arrow in FIG. 6, the oil O, which flowed into the second oil passage 62, receives a force acting outward in the radial direction by a centrifugal force of the rotating motor shaft 20a, and flows out of the motor shaft 20a through the first through-holes 26a~26d.

In an exemplary embodiment of the present disclosure, since the first through-hole 26a is opened to the gap 27a in the axial direction Y between the first end plate 24 and the rotor core 22, the oil O flowing out of the first through-hole 26a flows into the gap 27a. In addition, the oil O which has flowed into the gap 27a is jetted from the jet groove 24a toward the radial-directional outer side. In an exemplary embodiment of the present disclosure, since an opening of one axial-directional side in a portion of the radial-directional inner side of the jet groove 24a is closed by the washer 73, it is easy to guide the oil O, which has flowed into the jet groove 24a, towards the radial-directional outer side by the washer 73.

Since the first through-hole 26b is opened to the gap 27b in the axial direction Y between the second end plate 25 and the rotor core 22, the oil O flowing out of the first through-hole 26b flows into the gap 27b. In addition, the oil O which has flowed into the gap 27b is jetted from the jet groove 25a toward the radial-directional outer side. In an exemplary embodiment of the present disclosure, since an opening of the other axial-directional side in a portion of the radial-directional inner side of the jet groove 25a is closed by the flange portion 21f, it is easy to guide the oil O, which has flowed into the jet groove 25a, towards the radial-directional outer side by the flange portion 21f.

The oil O jetted from the jet grooves 24a, 25a to the radial-directional outer side is blown to the coil 32. Due to the above, the coil 32 may be cooled by the oil O. In an exemplary embodiment of the present disclosure, since the second oil passage 62 is provided inside the motor shaft 20a, the rotor 20 may be cooled by the oil O until the oil is jetted from the jet grooves 24a and 25a. As described above, in an exemplary embodiment of the present disclosure, the oil O discharged from the discharge port 45 is guided to the rotor 20 and the stator 30.

Since the first through-hole 26c is opened to a radial-directional inner side of the bearing holding portion 12e, the oil O which has flowed out of the first through-hole 26c is supplied to the bearing 70. Since the first through-hole 26d is opened to a radial-directional inner side of the bearing holding portion 11c, the oil O which has flowed out of the first through-hole 26d is supplied to the bearing 71. Due to the above, the oil O may be employed as lubricant for the bearings 70 and 71.

In addition, although FIG. 6 shows an example in which the oil O is jetted upward from the jet grooves 24a and 25a, the present disclosure is not limited thereto. Since the rotor 20 is rotated, circumferential-directional positions of the jet grooves 24a and 25a are changed according to rotation of the rotor 20. Due to the above, a direction of the oil O which is being jetted from the jet grooves 24a and 25a is changed to the circumferential direction, and the plurality of coils 32 disposed in the circumferential direction may be cooled by the oil O.

In this way, the pump part 40 may be driven by rotation of the motor shaft 20a, and the oil O stored in the housing 10 may be suctioned upward by the pump part 40 to supply the oil to the rotor 20, the stator 30, and the bearings 70 and 71. That is, the pump part 40 sends the oil O accommodated in the accommodating portion 14 to at least one of the stator 30 and the rotor 20. Due to the above, it is possible to cool the rotor 20 and the stator 30 using the oil O stored in the housing 10, and it is possible to enhance lubricity between each of the bearings 70 and 71 and the motor shaft main body 21.

In addition, in an exemplary embodiment of the present disclosure, since the oil O may be cooled by refrigerant flowing in the cooling flow passage 90 as described above, the rotor 20 and the stator 30 may be further cooled by the oil O. The oil O supplied to the stator 30 and the bearings 70 and 71 is fallen in the accommodating portion 14 and is stored again in the lower region of the accommodating portion 14. Due to the above, the oil O in the accommodating portion 14 may be circulated.

According to an exemplary embodiment of the present disclosure, by providing the first oil passage 61 and the second oil passage 62, the oil O discharged from the discharge port 45 may be forwarded into the motor shaft 20*a*. In addition, since the first through-holes 26*a*~26*d* are provided, the oil O which has flowed into the second oil passage 62 may be supplied to the stator 30 and the bearings 70 and 71.

Furthermore, according to an exemplary embodiment of the present disclosure, at the end portion of one axial-directional side of the motor shaft 20*a*, the second oil passage 62 provided in the motor shaft 20*a* is opened to the first oil passage 61 connected to the discharge port 45. Since the external gear 42 is fixed to the end portion of the one axial-directional side of the motor shaft 20*a*, the end portion of the one axial-directional side of the motor shaft 20*a* is disposed at a position relatively close to the discharge port 45. Therefore, it is possible to shorten a length of the first oil passage 61 connecting the discharge port 45 and the second oil passage 62. For this reason, according to an exemplary embodiment of the present disclosure, the entire length of the oil passage from the opening 12*f* to the second oil passage 62 may be easily shortened. Due to the above, it is easy to send the oil O to the second oil passage 62 provided inside the motor shaft 20*a*. Further, since the structure of the motor 1 may be easily simplified, a fabrication of the motor 1 may be made easy.

In addition, according to an exemplary embodiment of the present disclosure, the radial-directional inner side face of the attachment member 50 constitutes a portion of the radial-directional inner side face of the second oil passage 62. Therefore, it is possible to flow the oil O into the second oil passage 62 from the attachment member 50 while fixing the external gear 42 to the attachment member 50. Due to the above, as described above, the motor shaft main body 21 and the external gear 42 may be fixed to each other via the attachment member 50 without changing the dimension of the motor shaft main body 21 and the dimension of the external gear 42, and it is easy to open the second oil passage 62 to the first oil passage 61.

The inverter 83 shown in FIGS. 1 and 2 is electrically connected to stator 30. Although not shown in the drawings, the inverter 83 includes an inverter portion and a condenser portion. The inverter 83 controls power supplied to the stator 30. The inverter 83 is fixed to a lower end portion of the housing 10. More specifically, the inverter 83 is fixed to the lower wall portion 10*c*. The inverter 83 covers a lower side of the lower wall portion 10*c*.

In an exemplary embodiment of the present disclosure, at least a portion of the cooling flow passage 90 overlaps the inverter 83 when viewed along the vertical direction Z. Due to the above, the inverter 83 may also be cooled by refrigerant flowing through the cooling flow passage 90. In an exemplary embodiment of the present disclosure, for example, the entire cooling flow passages 90 overlap the inverter 83 when viewed along the vertical direction Z. In this way, the inverter 83 may be further cooled.

Figure 7:
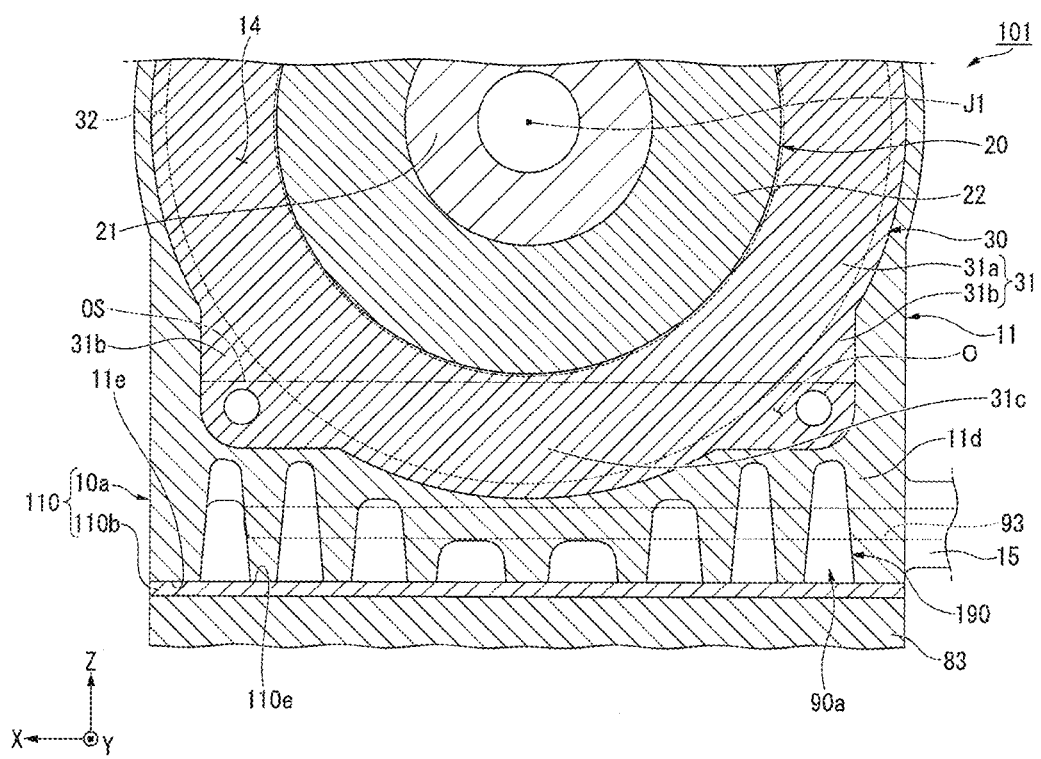
FIG. 7 is a cross-sectional view showing a part of a motor according to a modified example of an exemplary embodiment of the present disclosure.

As shown in FIG. 7, in a motor 101 of the present modified example, a cooling flow passage 190 is configured by closing a lower opening of the first groove portion 90*a* with a second housing 110*b* in the housing 110. The second housing 110*b* has a plate shape. A second contact face 110*e* of the second housing 110*b* is a plate face of an upper side of the plate-shaped second housing 110*b*, and is in contact with the first contact face 11*e*. The second contact face 110*e* closes the lower opening of the first groove portion 90*a*. Unlike the above-described second housing 10*b*, the second housing 110*b* does not have the second groove portion 90*b*.

In addition, although FIG. 7 shows a configuration in which the second groove portion 90*b* of the first groove portion 90*a* and the second groove portion 90*b* is not provided, the present disclosure is not limited to this configuration. For example, the first groove portion 90*a* of the first groove portion 90*a* and the second groove portion 90*b* may not be provided. In this case, an opening of an upper side of the second groove portion 90*b* is closed by the first contact face 11*e* of the first housing 10*a* to configure a cooling flow passage.

The present disclosure is not limited to the above-described exemplary embodiment, and may employ another configuration. The shape of the cooling flow passage 90 is not particularly limited. The cooling flow passage 90 does not have to have an undulated shape, and for example, may also be a wide flow passage linearly extending in the widthwise direction X, or may also be a wide flow passage linearly extending in the axial direction Y. In addition, the plurality of cooling flow passage 90 may be provided. The flow passage cross-sections of the first flow passage portions 91*a*~91*h* may have the same size and the same shape. The flow passage cross-sectional area of the cooling flow passage 90 may be uniform throughout the cooling flow passage 90 or may be partially different.

Further, the inlet 93*a* and the outlet 94*a* may be opened on opposite sides in the widthwise direction X. In addition, it is possible to employ a configuration in which the inlet 93*a* and the outlet 94*a* are provided in one housing of the first housing 10*a* and the second housing 10*b* and away from the other housing of the first housing 10*a* and the second housing 10*b*, respectively. That is, for example, the inlet 93*a* and the outlet 94*a* may be provided in the second housing 10*b* and away from the first housing 10*a*.

In addition, the first contact face 11*e* and the second contact face 10*e* may not be flat. The housing 10 may be a single member. In this case, the cooling flow passage 90 is provided in a single member.

The external gear 42 may be directly fixed to the motor shaft main body 21 without using the attachment member 50. In this case, the second oil passage 62 may be provided, for example, only inside the motor shaft main body 21. Further, the attachment member 50 may be fixed to an outer circumferential surface of the motor shaft main body 21.

Further, the attachment member 50 may be a member having a uniform outer diameter throughout the entire axial direction Y. That is, the outer diameter of the fitting portion 51 and the outer diameter of the fixing portion 52 may be the same. In this case, for example, when the fixing portion 52 is formed to have the outer diameter which is the same as or smaller than the outer diameter of the fitting portion 51 shown in FIG. 2, it is possible to reduce an outer diameter of the external gear 42 to which the fixing portion 52 is fixed. Due to the above, an outer diameter of the internal gear 43 may be reduced, so it is possible to reduce an inner diameter of the pump chamber 46. Therefore, an outer diameter of the protruding portion 13*d* in which the pump chamber 46 is provided may be reduced, and a radial-directional distance between a radial-directional outer face of the protruding portion 13*d* and an inner circumferential surface of the second concavity portion 12g may be increased. For that reason, for example, it is possible to dispose a portion of the sensor part 82, which protrudes to one axial-directional side, between the radial-directional outer face of the protruding portion 13d and the inner circumferential surface of the second concavity portion 12g in the radial direction, and the sensor part 82 may be brought closer to the outer lid portion 13. Due to the above, it is easy to miniaturize the entire motor 1 in the axial direction Y. In addition, a portion of the sensor part 82 which protrudes to one axial-directional side is, for example, a coil constituting the sensor part 82.

Moreover, the attachment member 50 may be comprised of two or more members. In this case, the attachment member 50 may include a first cylindrical member fitted into the hole portion 21g, and a second cylindrical member fitted into the first cylindrical member to extend to one axial-directional side of the motor shaft main body 21. In this case, the external gear 42 is fixed to one end portion on one axial-directional side of the second cylindrical member.

In addition, in the above-described exemplary embodiment, a portion of the attachment member 50 which passes through the second through-hole 13f is the fitting portion 51 having an outer diameter smaller than that of the fixing portion 52. For that reason, it is possible to employ a configuration in which the inner diameter of the second through-hole 13f is smaller than the outer diameter of the fixing portion 52 and a gap in the radial direction between the outer circumferential surface of the attachment member 50 and the inner circumferential surface of the second through-hole 13f is comparatively small. Due to the above, it is possible to suppress the oil O in the pump chamber 46 from being leaked through the second through-hole 13f. When this configuration is employed, after attaching the outer lid portion 13 to the inner lid portion 12, an assembler inserts the fitting portion 51 into the second through-hole 13f from a left opening of the first concavity portion 13e and fits it into the hole portion 21g of the motor shaft main body 21, so the attachment member 50 is fixed to the motor shaft main body 21.

Further, if the second through-hole 13f can be made small, an axial-directional inner end portion of a closing portion which closes an opening of the other axial-directional side of the pump chamber 46 may be disposed more inward in the radial direction. In an exemplary embodiment of the present disclosure, the closing portion that closes the opening on the other axial-directional side of the pump chamber 46 is a portion of the axial-directional outer side of the second through-hole 13f in the protruding portion 13d. Since the radial-directional inner end portion of the closing portion can be disposed more inward in the radial direction, even if the outer diameter of the external gear 42 and the outer diameter of the internal gear 43 are made smaller, an opening of the other axial-directional side of the pump chamber 46 can be suitably closed by the closing portion. Due to the above, it is possible to reduce the inner diameter of the pump chamber 46. Accordingly, in the same manner as described above, a part of the sensor part 82 may be disposed between a radial-directional outer face of the protruding portion 13d and an inner circumferential surface of the second concavity portion 12g in the radial direction, and as a result, it is easy to miniaturize the motor 1 in the axial direction Y.

One direction in which the central axis extends, that is, the axial direction in which the motor shaft 20a extends is not particularly limited, may intersect with the vertical direction Z without being orthogonal thereto, or may be parallel to the vertical direction Z. The rotor core 22 may be fixed to an outer peripheral surface of the motor shaft main body 21 by press-fitting or the like. In this case, the first end plate 24 and the second end plate 25 may not be provided. In addition, in this case, the oil O flowing out from the first through-holes 26a and 26b may be directly supplied to the coil 32, or a hole which is in communication with the first through-hole 26a may be provided in the rotor core 22 to supply the oil O to the coil 32 through the hole of the rotor core 22. Furthermore, the oil O may be supplied to the stator core 31.

Moreover, the position to which the oil O discharged from the discharge port 45 is supplied is not particularly limited, and for example, the oil may be supplied to only one or two of the rotor 20, the stator 30, and the bearings 70 and 71, and may not be supplied to all. The oil O discharged from the discharge port 45 may be supplied to, for example, an inner side face of vertical-directional upper region of the accommodating portion 14. In this case, since the housing 10 is cooled, it is possible to indirectly cool the stator 30. Further, any one or more of the first through-holes 26a~26d may not be provided. The tooth profile of the tooth portion 42a of the external gear 42 and the tooth profile of the tooth portion 43a of the internal gear 43 may be the cycloid tooth profile or may be the involute tooth profile. In addition, the pump part 40 may be configured to send the oil O to either the stator 30 or the rotor 20. Moreover, the pump part 40 does not need to be provided. The inverter 83 may not be provided.

Features of the above-described preferred embodiments and the modifications thereof may be combined appropriately as long as no conflict arises.

While preferred embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

The invention claimed is:

1. A motor, comprising:
a rotor having a motor shaft disposed along a central axis extending in an axial direction, the axial direction perpendicular to a vertical direction;
a stator facing the rotor via a gap in a radial direction; and
a housing having an accommodating portion configured to accommodate the rotor and the stator, and to enable oil to be stored therein,
wherein the housing comprises a lower wall portion facing a vertical-directional lower region in an inside of the accommodating portion,
the lower wall portion comprises a cooling flow passage formed therein, and refrigerant flows in the cooling flow passage,
at least a portion of the cooling flow passage overlaps the vertical-directional lower region in the inside of the accommodating portion when viewed along the vertical direction,
the cooling flow passage comprises a plurality of first flow passage portions extending in the axial direction,
the stator includes
an annular stator core main body, and
a pair of first stator core protruding portions, each protruding from the stator core main body outwardly in the radial direction,
each of the first stator core protruding portions is provided on a respective one of two sides of a lower portion of the stator core main body, the two sides opposite each other in a widthwise direction perpendicular to both the axial direction and the vertical direction, the first stator core protruding portions have respective screw holes through which screws fastened to the housing pass through the first stator core protruding portions to fix the stator core to the housing, and when viewed along the axial direction,
- a first imaginary line connecting centers of the screw holes of the first stator core protruding portions is below the central axis in the vertical direction, and
- the first imaginary line is parallel to a second imaginary line connecting uppermost positions among upper ends, in the vertical direction, of the plurality of first flow passage portions.

2. The motor of claim 1, wherein the cooling flow passage extends in an undulated shape when viewed along the vertical direction.

3. The motor of claim 2, wherein the plurality of first flow passage portions are arranged side by side in the widthwise direction, and are connected to each other.

4. The motor of claim 3, wherein when viewed along the axial direction, the upper ends of the plurality of first flow passage portions are disposed along a radial-directional outer face of the stator.

5. The motor of claim 3, wherein a lower face, in the vertical direction, of the lower wall portion is orthogonal to the vertical direction, and lower ends, in the vertical direction, of the plurality of first flow passage portions are disposed along the lower face of the lower wall portion.

6. The motor of claim 3, wherein height dimensions, in the vertical direction, of the plurality of first flow passage portions are decreased, in the widthwise direction, toward the central axis.

7. The motor of claim 3, wherein among the plurality of first flow passage portions arranged side by side in the widthwise direction, two outermost first flow passage portions in the widthwise direction have the upper ends being the uppermost positions connected by the second imaginary line.

8. The motor of claim 1, wherein the cooling flow passage passes below the motor shaft in the vertical direction, and is disposed over a range from one side of the motor shaft to the other side of the motor shaft in the widthwise direction.

9. The motor of claim 1, wherein the cooling flow passage comprises an inlet into which the refrigerant flows and an outlet through which the refrigerant flows out, and the inlet and the outlet are opened in the widthwise direction.

10. The motor of claim 1, wherein the housing comprises a first housing having the accommodating portion and a second housing fixed to a lower side of the first housing in the vertical direction, and the cooling flow passage is disposed between the first housing and the second housing in the vertical direction.

11. The motor of claim 10, wherein
the first housing comprises
- a first contact face at the lower side of the first housing, and
- a first groove portion concaved from the first contact face upwardly in the vertical direction, the second housing comprises
- a second contact face in contact with the first contact face, and
- a second groove portion concaved from the second contact face downwardly in the vertical direction, and the first groove portion and the second groove portion are connected to each other in the vertical direction to constitute the cooling flow passage.

12. The motor of claim 11, wherein a width, in the widthwise direction, of the first groove portion is decreased as the first groove portion extends upwardly in the vertical direction.

13. The motor of claim 10, wherein
the first housing comprises a first contact face at the lower side of the first housing,
the second housing comprises a second contact face in contact with the first contact face, and
the first contact face and the second contact face are flat faces.

14. The motor of claim 10, wherein
the cooling flow passage comprises an inlet into which the refrigerant flows and an outlet through which the refrigerant flows out, and
the inlet and the outlet are provided in one housing of the first housing and the second housing and away from the other housing of the first housing and the second housing, respectively.

15. The motor of claim 1, further comprising:
a pump driven through the motor shaft to send oil accommodated in the accommodating portion to at least one of the stator and the rotor.

16. The motor of claim 1, further comprising:
an inverter electrically connected to the stator, wherein
the inverter is fixed to the lower wall portion, and
a portion of the cooling flow passage overlaps the inverter when viewed along the vertical direction.

* * * * *